(12) United States Patent
Zhang et al.

(10) Patent No.: US 11,493,798 B2
(45) Date of Patent: Nov. 8, 2022

(54) DISPLAY PANEL, PREPARATION METHOD THEREOF, AND DISPLAY APPARATUS

(71) Applicant: BOE Technology Group Co., Ltd., Beijing (CN)

(72) Inventors: Zhao Zhang, Beijing (CN); Yanqing Chen, Beijing (CN); Wei Li, Beijing (CN); Weida Qin, Beijing (CN); Kai Chen, Beijing (CN); Jiguo Wang, Beijing (CN); Wei Yan, Beijing (CN); Xiaofeng Zhang, Beijing (CN); Zeliang Li, Beijing (CN); Jian Zhang, Beijing (CN); Zhen Wang, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/509,080

(22) Filed: Oct. 25, 2021

(65) Prior Publication Data
US 2022/0276528 A1  Sep. 1, 2022

(30) Foreign Application Priority Data
Feb. 26, 2021  (CN) .......................... 202110220239.X

(51) Int. Cl.
*G02F 1/1335* (2006.01)
*G02F 1/1362* (2006.01)
(Continued)

(52) U.S. Cl.
CPC ...... *G02F 1/133512* (2013.01); *G02F 1/1341* (2013.01); *G02F 1/136286* (2013.01); *G02F 1/1368* (2013.01); *G02F 1/13394* (2013.01); *G02F 1/133553* (2013.01); *G02F 1/133626* (2021.01); *G02F 1/133638* (2021.01); *G02F 1/136209* (2013.01); *G02F 2413/02* (2013.01); *G02F 2413/05* (2013.01); *G02F 2413/06* (2013.01); *G02F 2413/08* (2013.01)

(58) Field of Classification Search
None
See application file for complete search history.

(56) References Cited

U.S. PATENT DOCUMENTS

| | | | |
|---|---|---|---|
| 6,373,540 B1* | 4/2002 | Munakata | G02F 1/13725 349/110 |
| 2001/0050729 A1* | 12/2001 | Kim | G02F 1/136209 349/44 |

(Continued)

*Primary Examiner* — Shan Liu
(74) *Attorney, Agent, or Firm* — Ling Wu; Stephen Yang; Ling and Yang Intellectual Property

(57) ABSTRACT

Provided are a display panel, a preparation method thereof, and a display apparatus. The display panel includes a first substrate and a second substrate disposed oppositely, and a liquid crystal layer sandwiched between the first substrate and the second substrate, wherein the first substrate includes a black matrix layer and a color filter layer which are sequentially disposed on a first base substrate; at least one of the first substrate and the second substrate further includes a spacer; and the black matrix layer includes at least one first black matrix, and an orthographic projection of each first black matrix on the first base substrate covers an orthographic projection of the spacer on the first base substrate.

10 Claims, 11 Drawing Sheets

(51) Int. Cl.
*G02F 1/1341* (2006.01)
*G02F 1/1368* (2006.01)
*G02F 1/13363* (2006.01)
*G02F 1/1339* (2006.01)

(56) References Cited

U.S. PATENT DOCUMENTS

2002/0008800 A1* 1/2002 Matsumoto ....... G02F 1/136209
 349/44
2004/0114075 A1* 6/2004 Iwasa ............... G02F 1/136209
 349/113
2007/0296908 A1* 12/2007 Koyama ............. G02F 1/13394
 349/114
2020/0064698 A1* 2/2020 Li ..................... G02F 1/133553

* cited by examiner

DISPLAY PANEL, PREPARATION METHOD THEREOF, AND DISPLAY APPARATUS

CROSS-REFERENCE TO RELATED APPLICATION

The present application claims the priority to Chinese Patent Application No. 202110220239.X, filed to the CNIPA on Feb. 26, 2021, the content of which is hereby incorporated by reference.

TECHNICAL FIELD

Embodiments of the present disclosure relate to, but are not limited to, the field of display technology, and in particular, to a display panel, a preparation method thereof, and a display apparatus.

BACKGROUND

A Liquid Crystal Display (LCD) has characteristics of small size, low power consumption, and no radiation, and has been developed rapidly. A main structure of a LCD includes a Thin Film Transistor (TFT) array substrate of a cell (CELL) and a Color Filter (CF) substrate that are cell-assembled, Liquid Crystal (LC) molecules are filled between the array substrate and the color filter substrate, and a common electrode and a pixel electrode are controlled to form an electric field that drives deflection of liquid crystal, thereby achieving gray tone display.

According to different types of light sources adopted, LCDs may be divided into transmissive type, reflective type, and transflective type, among which transflective LCDs have advantages of transmissive LCDs and reflective LCDs. However, due to existence of color resistance mixing and an oblique electric field, color mixing occurs in a transmissive picture, and a color gamut is extremely low, which seriously affects image quality level and user experience adversely.

SUMMARY

The following is a summary of subject matters described in the present disclosure in detail. The summary is not intended to limit the scope of protection of claims.

An embodiment of the present disclosure provides a display panel, which includes: a first substrate and a second substrate disposed oppositely, and a liquid crystal layer sandwiched between the first substrate and the second substrate, wherein the first substrate includes a black matrix layer and a color filter layer which are sequentially disposed on a first base substrate; at least one of the first substrate and the second substrate further includes a spacer; and the black matrix layer includes at least one first black matrix, and an orthographic projection of each first black matrix on the first base substrate covers an orthographic projection of the spacer on the first base substrate.

In an exemplary embodiment, the second substrate includes a second base substrate and an array structure layer disposed on the second base substrate, wherein the array structure layer includes a gate electrode disposed on the second base substrate, a first insulating layer covering the gate electrode, an active layer disposed on the first insulating layer, a source electrode and a drain electrode disposed on the first insulating layer and the active layer, a second insulating layer covering the source electrode and the drain electrode, and a connection electrode disposed on the second insulating layer, and the second insulating layer is disposed with at least one first via, and the connection electrode is connected to the drain electrode through the first via; and the black matrix layer further includes at least one second black matrix, and an orthographic projection of each second black matrix on the first base substrate covers an orthographic projection of one first via on the first base substrate.

In an exemplary embodiment, a distance between an edge of the orthographic projection of the first black matrix on the first base substrate and an edge of the orthographic projection of the corresponding spacer on the first base substrate is 1 µm to 3 µm; and a distance between an edge of the orthographic projection of the second black matrix on the first base substrate and an edge of the orthographic projection of the corresponding first via on the first base substrate is 1 µm to 3 µm.

In an exemplary embodiment, the second substrate includes an array structure layer, a shielding layer, an insulating layer, and a reflective layer which are sequentially disposed on the second base substrate, wherein: the reflective layer includes a plurality of reflective units arranged in an array along a first direction and a second direction intersecting with each other, the plurality of reflective units form a plurality of reflective rows and a plurality of reflective columns, a space area between adjacent reflective columns forms a first space area, and a space area between adjacent reflective rows forms a second space area; and the shielding layer includes a plurality of light shielding units arranged sequentially along the first direction, each light shielding unit extends along the second direction, and an orthographic projection of each light shielding unit on the second base substrate covers an orthographic projection of the first space area on the second base substrate.

In an exemplary embodiment, the first substrate further includes a first polarizer disposed on a side of the first substrate away from the second substrate, and the first polarizer includes a first quarter-wave plate, a second adhesive layer, a half-wave plate, a third adhesive layer, a first cellulose triacetate layer, a first poly vinyl alcohol layer, and a second cellulose triacetate layer which are sequentially stacked from bottom to top, wherein, an absorption axis angle of the first poly vinyl alcohol layer is n°, a slow axis angle of the half-wave plate is $((n+41)\%180°)$ to $((n+43)\%180°)$, and a slow axis angle of the first quarter-wave plate is $((n+162)\%180°)$ to $((n+164)\%180°)$, and n is between 0 and 180.

In an exemplary embodiment, the second substrate further includes a second polarizer disposed on a side of the second substrate away from the first substrate, and the second polarizer includes a second quarter-wave plate, a fourth adhesive layer, a third cellulose triacetate layer, a second poly vinyl alcohol layer, and a fourth cellulose triacetate layer which are sequentially stacked from bottom to top, wherein, an absorption axis angle of the second poly vinyl alcohol layer is $((n+89)\%180°)$ to $((n+91)\%180°)$, and a slow axis angle of the second quarter-wave plate is $((n+134)\%180°)$ to $((n+136)\%180°)$.

An embodiment of the present disclosure further provides a display panel, which includes: a first substrate and a second substrate disposed oppositely, and a liquid crystal layer sandwiched between the first substrate and the second substrate, wherein the second substrate includes an array structure layer, a shielding layer, an insulating layer, and a reflective layer which are sequentially disposed on a second base substrate; the reflective layer includes a plurality of reflective units arranged in an array along a first direction and a second direction intersecting with each other, wherein the plurality of reflective units form a plurality of reflective rows and a plurality of reflective columns, a space area between adjacent reflective columns forms a first space area, and a space area between adjacent reflective rows forms a second space area; and the shielding layer includes a plurality of light shielding units arranged sequentially along the first direction, each light shielding unit extends along the second direction, and an orthographic projection of each light shielding unit on the second base substrate covers an orthographic projection of the first space area on the second base substrate.

In an exemplary embodiment, each light shielding unit includes a first light shielding part and a second light shielding part, and an orthographic projection of the first light shielding part on the second base substrate is not overlapped with an orthographic projection of the second space area on the second base substrate; an orthographic projection of the second light shielding part on the second base substrate is overlapped with the orthographic projection of the second space area on the second base substrate, and a width of the second light shielding part in the first direction is larger than a width of the first light shielding part in the first direction.

In an exemplary embodiment, the first light shielding part includes a first edge and a second edge which are disposed opposite to each other in the first direction, and the first space area includes a third edge and a fourth edge which are disposed opposite to each other in the first direction, and a space between the first edge of the first light shielding part and the third edge of the corresponding first space area is 1 μm to 3 μm, and a space between the second edge of the first light shielding part and the fourth edge of the corresponding first space area is 1 μm to 3 μm.

In an exemplary embodiment, a width of the first space area in the first direction is 3 μm to 5 μm, and a width of the second space area in the second direction is 7 μm to 9 μm.

An embodiment of the present disclosure further provides a display panel, which includes: a first substrate and a second substrate which are disposed oppositely, and a liquid crystal layer sandwiched between the first substrate and the second substrate, wherein the first substrate includes a first polarizer disposed on a side of the first substrate away from the second substrate, and the first polarizer includes a first quarter-wave plate, a second adhesive layer, a half-wave plate, a third adhesive layer, a first cellulose triacetate layer, a first poly vinyl alcohol layer, and a second cellulose triacetate layer which are sequentially stacked from bottom to top, wherein an absorption axis angle of the first poly vinyl alcohol layer is n°, a slow axis angle of the half-wave plate is $((n+41)\%180°)$ to $((n+43)\%180°)$, a slow axis angle of the first quarter-wave plate is $((n+162)\%180°)$ to $((n+164)\%180°)$, and n is between 0 and 180.

In an exemplary embodiment, the second substrate includes a second polarizer disposed on a side of the second substrate away from the first substrate, and the second polarizer includes a second quarter-wave plate, a fourth adhesive layer, a third cellulose triacetate layer, a second poly vinyl alcohol layer, and a fourth cellulose triacetate layer which are sequentially stacked from bottom to top, wherein, an absorption axis angle of the second poly vinyl alcohol layer is $((n+89)\%180°)$ to $((n+101)\%180°)$, and a slow axis angle of the second quarter-wave plate is $((n+134)\%180°)$ to $((n+136)\%180°)$.

An embodiment of the present disclosure further provides a display apparatus including any display panel as described above.

An embodiment of the present disclosure further provides a preparation method of a display panel, including: forming a first substrate and a second substrate respectively, wherein the first substrate includes a black matrix layer and a color filter layer which are sequentially disposed on a first base substrate; at least one of the first substrate and the second substrate further includes a spacer, and the black matrix layer includes at least one first black matrix, and an orthographic projection of each first black matrix on the first base substrate covers an orthographic projection of the spacer on the first base substrate; and cell-assembling the first substrate and the second substrate, and filling liquid crystal between the first substrate and the second substrate.

An embodiment of the present disclosure further provides a preparation method of a display panel, including: forming a first substrate and a second substrate respectively, wherein the second substrate includes an array structure layer, a shielding layer, an insulating layer, and a reflective layer which are sequentially disposed on a second base substrate; the reflective layer includes a plurality of reflective units arranged in an array along a first direction and a second direction intersecting with each other, wherein the plurality of reflective units form a plurality of reflective rows and a plurality of columns, a space area between adjacent reflective columns forms a first space area, and a space area between adjacent reflective rows forms a second space area; the shielding layer includes a plurality of light shielding units arranged sequentially along the first direction, each light shielding unit extends along the second direction, and an orthographic projection of each light shielding unit on the second base substrate covers an orthographic projection of the first space area on the second base substrate; and cell-assembling the first substrate and the second substrate, and filling liquid crystal between the first substrate and the second substrate.

An embodiment of the present disclosure further provides a preparation method of a display panel, including: forming a first substrate and a second substrate respectively; cell-assembling the first substrate and the second substrate, and filling liquid crystal between the first substrate and the second substrate; and attaching a first polarizer to a side of the first substrate away from the second substrate, and the first polarizer includes a first quarter-wave plate, a second adhesive layer, a half-wave plate, a third adhesive layer, a first triacetate cellulose layer, a first poly vinyl alcohol layer, and a second triacetate cellulose layer which are sequentially stacked from bottom to top, wherein an absorption axis angle of the first poly vinyl alcohol layer is n°, a slow axis angle of the half-wave plate is $((n+41)\%180°)$ to $((n+43)\%180°)$, a slow axis angle of the first quarter-wave plate is $((n+162)\%180°)$ to $((n+164)\%180°)$, and n is between 0 and 180.

Other features and advantages of the present disclosure will be described in the subsequent description, and, in part, become apparent from the description, or may be understood by implementing the present disclosure. Other advantages of the present disclosure may be implemented and achieved by solutions described in the specification and accompanying drawings.

Other aspects may be comprehended upon reading and understanding of the accompanying drawings and detailed descriptions.

BRIEF DESCRIPTION OF DRAWINGS

The accompanying drawings are used to provide an understanding of technical solutions of the present disclosure, constitute a part of the specification, and are used to explain, together with the embodiments of the present disclosure, the technical solutions of the present disclosure and are not intended to constitute a limitation to the technical solutions of the present disclosure.

DETAILED DESCRIPTION

Figure 1:
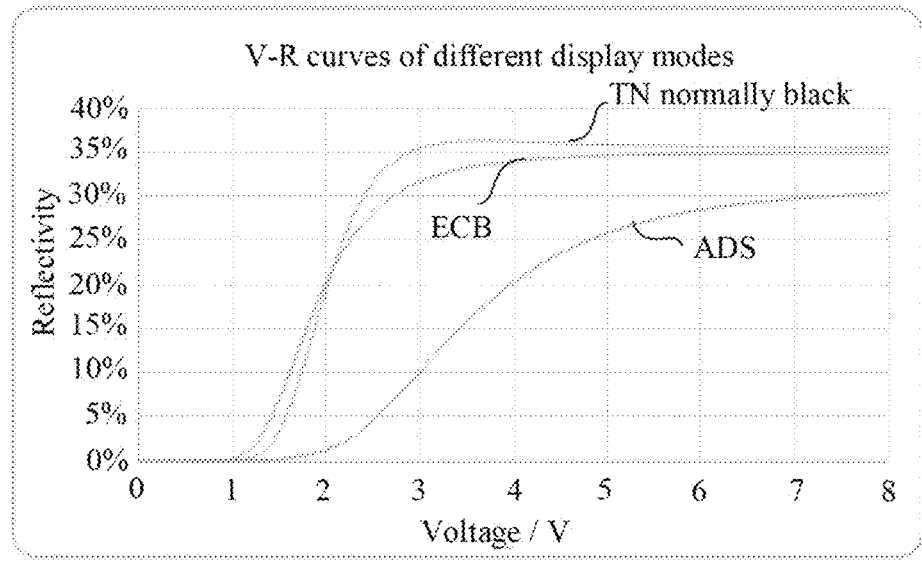
FIG. 1 is an optical simulation comparison diagram of different display modes.

Hereinafter, embodiments will be described with reference to the drawings. It should be noted that the embodiments may be implemented in many different forms. Those of ordinary skills in the art may readily understand a fact that implementation modes and contents may be transformed into a variety of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, a size of each constituent element, or a thickness or area of a layer, is sometimes exaggerated for clarity. Therefore, an implementation mode of the present disclosure is not necessarily limited to the size shown, and a shape and a size of each component in the drawings do not reflect true proportions. In addition, the drawings schematically show ideal examples, and an implementation of the present disclosure is not limited to the shapes or values shown in the drawings.

The ordinal numbers "first", "second", "third" and the like in this specification are used to avoid confusion between constituent elements, but not to constitute limitations on quantities.

In this specification, for sake of convenience, wordings, such as "central", "upper", "lower", "front", "rear", "vertical", "horizontal", "top", "bottom", "inner", "outer" and the like which are used to indicate orientation or positional relations, to describe the positional relations between constituent elements with reference to the drawings, are only for a purpose of facilitating description of this specification and simplifying the description, rather than indicating or implying that an apparatus or element referred to must have a specific orientation, or must be constructed and operated in a particular orientation, and therefore cannot be construed as limitations on the present disclosure. The positional relations of the constituent elements may be appropriately changed according to a direction in which each of the constituent elements is described. Therefore, the wordings are not limited in the specification, and may be replaced appropriately according to situations.

In this specification, terms "install", "connect", and "couple" shall be understood in a broad sense unless otherwise explicitly specified and defined. For example, it may be a fixed connection, or may be a detachable connection, or an integral connection; it may be a mechanical connection, or may be an electrical connection; it may be a direct connection, or may be an indirect connection through middleware, or may be an internal connection between two elements. Those of ordinary skills in the art may understand meanings of the terms in the present disclosure according to specific situations.

In this specification, a transistor refers to an element including at least three terminals, namely a gate electrode, a drain electrode, and a source electrode. The transistor has a channel area between the drain electrode (a drain electrode terminal, a drain area, or a drain electrode) and the source electrode (a source electrode terminal, a source area, or a source electrode), and a current may flow through the drain electrode, the channel area, and the source electrode. It should be noted that in this specification, the channel area refers to a area through which a current mainly flows.

In this specification, it may be a case that a first electrode is a drain electrode and a second electrode is a source electrode, or it may be a case that a first electrode is a source electrode and a second electrode is a drain electrode. Functions of a "source electrode" and a "drain electrode" are sometimes interchangeable in a case where transistors with opposite polarities are used or in a case where a direction of a current changes during circuit operation. Therefore, in this specification, a "source electrode" and a "drain electrode" are interchangeable.

In this specification, an "electrical connection" includes a case where constituent elements are connected together through an element having a certain electrical function. The "element having a certain electrical function" is not particularly limited as long as it may transmit and receive electrical signals between connected constituent elements. Examples of the "element having a certain electrical function" include not only electrodes and wirings, but also switching elements such as transistors, and include resistors, inductors, capacitors, and other elements having a plurality of functions.

In this specification, "parallel" refers to a state in which an angle formed by two straight lines is above −10 degrees and below 10 degrees, and thus also includes a state in which the angle is above −5 degrees and below 5 degrees. In addition, "perpendicular" refers to a state in which an angle formed by two straight lines is above 80 degrees and below 100 degrees, and thus may include a state in which the angle is above 85 degrees and below 95 degrees.

In this specification, a "film" and a "layer" may be interchangeable. For example, sometimes a "conductive layer" may be replaced by a "conductive film". Similarly, an "insulating film" may sometimes be replaced by an "insulating layer".

A transflective LCD has both a reflective mode and a transmissive mode, and is no longer restricted by an external environment, and reflection is dominant, and transmission is supplementary. In recent years, its demand in the fields of wearing and industrial control has been increasing. In positioning of a wearable product, low power consumption is an important product performance. In order to match this characteristic, a low voltage driving mode becomes a primary choice. FIG. 1 is an optical simulation comparison diagram of different display modes. Considering light efficiency of liquid crystal, a Twisted Nematic (TN) normally black mode has become a primary choice for low-voltage driving.

The transflective LCD generally includes the following structures.

1) There is No Black Matrix (BM) in a Valid Display Area (Active Area).

Figure 2A:
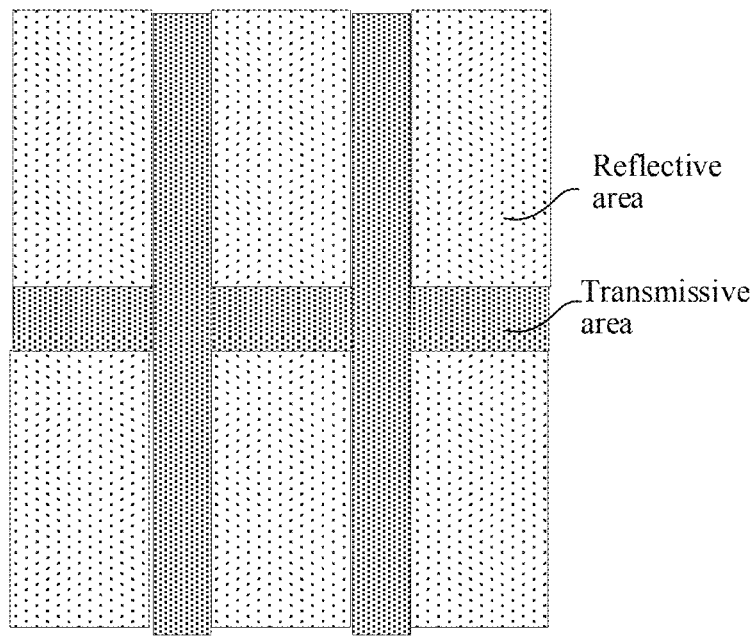
FIGS. 2a to 2c are schematic diagrams of structures of valid display areas of three different transflective display panels.
Figure 3:
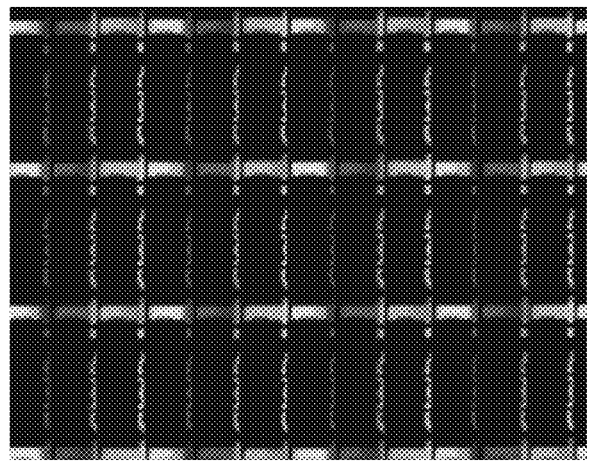
FIG. 3 is a schematic diagram of color mixing effects of transmissive pictures of some display panels.

As shown in FIG. 2a, there is no black matrix in an Active Area, and a reflective layer includes multiple reflective units arranged in an array, and the multiple reflective units form a reflective area. A space area between the reflective units serves as a transmissive area. An advantage of this structure is to ensure that a reflective opening is maximized, that is, a reflectivity is maximized. A disadvantage of it is that in a data line direction, a color resistance mixing area is not shielded. Due to existence of color resistance mixing and an oblique electric field, color mixing occurs in a transmissive picture. As shown in FIG. 3, a color mixing ratio is as high as 50%, and a color gamut in a transmissive mode is low, which is not conducive to improvement of image quality.

2) A Valid Display Area Includes a Grid BM, and a Reflective Area and a Transmissive Area Divide Up a Pixel Opening Area.

Figure 2B:
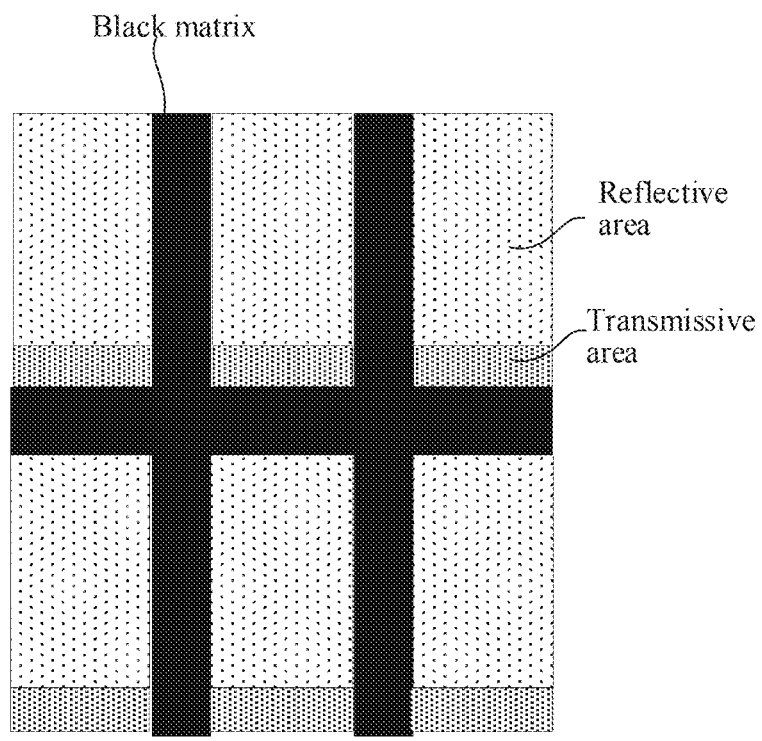

As shown in FIG. 2b, a part of the pixel opening area in the valid display area is used as the reflective area, and a remaining part of the pixel opening area is used as the transmissive area. An advantage of this structure is to ensure a higher color gamut of the reflective mode and the transmissive mode and low risk of color mixing. A disadvantage of it is that a reflective opening is small, and fluctuation of alignment in a cell forming process will affect a reflectivity and a color gamut of the transmissive mode adversely.

3) There is a BM in the Valid Display Area in a Data Line Direction, but there is No BM in a Gate Line Direction, and a Transverse Space Area is Used as a Transmissive Area.

Figure 2C:
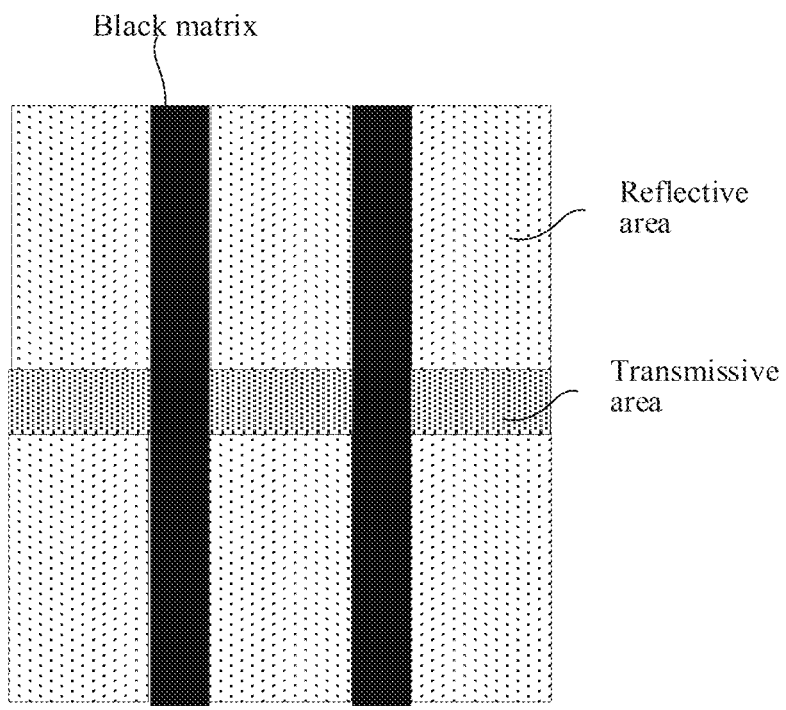

As shown in FIG. 2c, a reflective layer includes multiple reflective units arranged in an array, the multiple reflective units form a reflective area, the data line direction is shielded by the BM and the gate line direction has no BM, and a space area between adjacent reflective rows serves as the transmissive area. An advantage of this structure is color mixing in a transmissive mode is lighter and a reflective opening is larger. However, since a striped BM is prone to peeling, it is required that a width of a BM should not be too narrow, which leads to a metal pattern of the reflective layer being shielded partially, resulting in loss of reflective opening and a decreased reflectivity.

Figure 4:
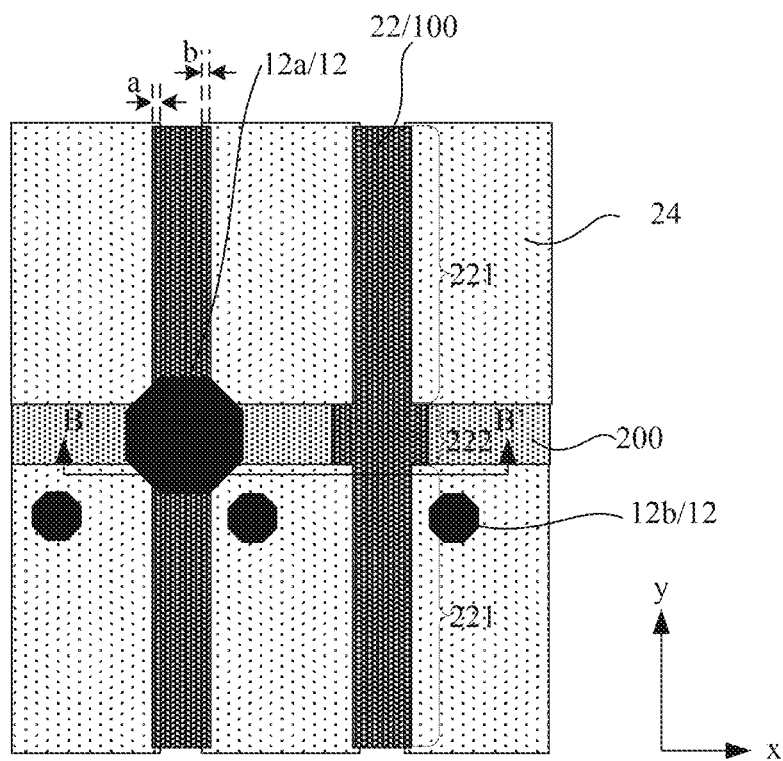
FIG. 4 is a schematic diagram of a planar structure of a display panel according to an embodiment of the present disclosure.
Figure 5:
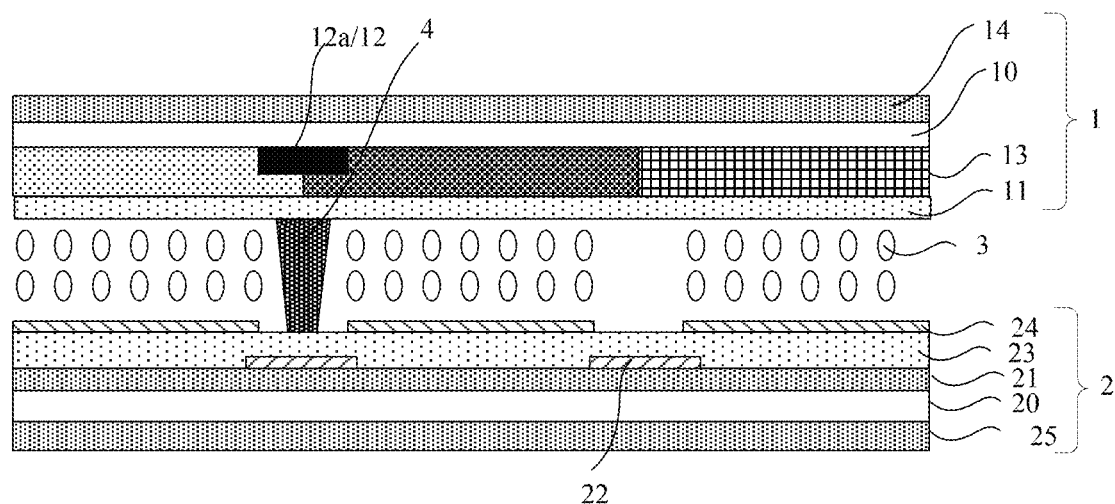
FIG. 5 is a schematic diagram of a cross-sectional structure of a BB' area of a display panel shown in FIG. 4.

FIG. 4 is a schematic diagram of a planar structure of a display panel according to an embodiment of the present disclosure. FIG. 5 is a schematic diagram of a cross-sectional structure of an Active area of a display panel shown in FIG. 4. As shown in FIG. 4 and FIG. 5, the display panel of the embodiment of the present disclosure includes a first substrate 1 and a second substrate 2 disposed oppositely, and a liquid crystal layer 3 sandwiched between the first substrate 1 and the second substrate 2.

The second substrate 2 includes an array structure layer 21, a shielding layer 22, an insulating layer 23, and a reflective layer 24 which are sequentially disposed on a second base substrate 20.

The reflective layer 24 includes multiple reflective units arranged in an array along a first direction x and a second direction y intersecting with each other, the multiple reflective units form multiple reflective rows and multiple reflective columns, and the multiple reflective rows and the multiple reflective columns form a reflective area. A space area between adjacent reflective columns forms a first space area 100, and a space area between adjacent reflective rows forms a second space area 200.

The shielding layer 22 includes multiple light shielding units arranged sequentially along the first direction x, each light shielding unit extends along the second direction y, and an orthographic projection of each light shielding unit on the second base substrate 20 covers an orthographic projection of the first space area 100 on the second base substrate 20, that is, a width of each light shielding unit in the first direction x is greater than or equal to a width of the first space area 100 in the first direction x.

Figure 6:
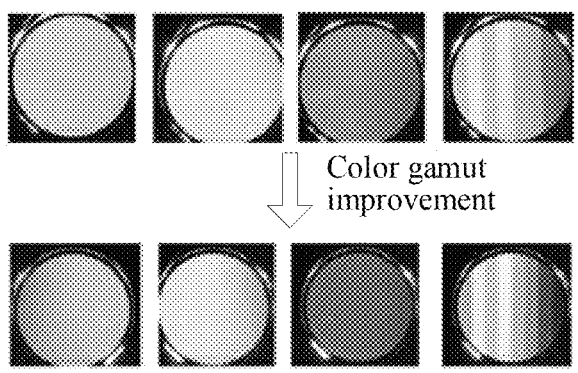
FIG. 6 is a schematic diagram of a color gamut improvement effect of a display panel according to an embodiment of the present disclosure.

According to the display panel of the embodiment of the present disclosure, multiple light shielding units are disposed, such that the whole display panel does not need to be disposed with a black matrix for avoiding color mixing of a transmissive picture, so the whole display panel may achieve a design of a maximum reflectivity without influence of process problems such as BM peeling or fluctuation of alignment. FIG. 6 is comparison diagrams of color gamut effects between display panels in some technologies and the display panel according to the embodiment of the present disclosure in a transmissive mode. As shown in FIG. 6, a color mixing ratio of the transmissive picture may be reduced to below 5%, thereby improving user experience. In addition, the display panel according to the embodiment of the present disclosure does not need to increase a quantity of masks, and the shielding layer 22 may be made in a same layer as a shielding layer used for shielding semiconductor silicon in a current display panel, which has good process compatibility, no change in existing process equipment, and has good application prospects.

In an embodiment of the present application, the second space area 200 forms a transmissive area, and the multiple reflection units form a reflection area.

In some exemplary embodiments, as shown in FIG. 4, each light shielding unit includes a first light shielding part 221 and a second light shielding part 222, and an orthographic projection of the first light shielding part 221 on the second base substrate 20 is not overlapped with an orthographic projection of the second space area 200 on the second base substrate 20. An orthographic projection of the second light shielding part 222 on the second base substrate 20 is overlapped with the orthographic projection of the second space area 200 on the second base substrate 20, and a width of the second light shielding part 222 in the first direction x is larger than a width of the first light shielding part 221 in the first direction x.

In some exemplary embodiments, as shown in FIG. 4, the first light shielding part 221 includes a first edge and a second edge which are disposed opposite to each other in the first direction x. The first space area 100 includes a third edge and a fourth edge which are disposed opposite to each other in the first direction x. A space a between the first edge of the first light shielding part 221 and the third edge of the corresponding first space area 100 is 1 μm to 3 μm, and a space b between the second edge of the first light shielding part 221 and the fourth edge of the corresponding first space area 100 is 1 μm to 3 μm. Exemplarily, a space a between the first edge of the first light shielding part 221 and the third edge of the corresponding first space area 100 is 2 μm, and a space b between the second edge of the first light shielding part 221 and the fourth edge of the corresponding first space area 100 is 2 μm.

In some exemplary embodiments, as shown in FIG. 4, a width of the first space area 100 in the first direction x is 3 μm to 5 μm, and a width of the second space area 200 in the second direction y is 7 μm to 9 μm. Exemplary, a width of the first space area 100 in the first direction x is 4 μm, and a width of the second space area 200 in the second direction y is 8 μm.

As shown in FIG. 4 and FIG. 5, an embodiment of the present disclosure further provides a display panel, which includes a first substrate 1 and a second substrate 2 disposed oppositely, and a liquid crystal layer 3 sandwiched between the first substrate 1 and the second substrate 2.

The first substrate 1 includes a black matrix layer 12, a color filter layer 13, and a common electrode layer 11 sequentially disposed on a first base substrate 10. At least one of the first substrate 1 and the second substrate 2 further includes a spacer 4.

The black matrix layer 12 includes at least one first black matrix 12a, and an orthographic projection of the first black matrix 12a on the first base substrate 10 covers an orthographic projection of the spacer 4 on the first base substrate 10.

According to the display panel of the embodiment of the present disclosure, at least one first black matrix 12a is disposed, and an orthographic projection of each first black matrix 12a on the first base substrate 10 covers an orthographic projection of one spacer 4 on the first base substrate 10, such that the whole display panel does not need to be disposed with a strip-shaped black matrix for avoiding color mixing of a transmissive picture. Therefore, the whole display panel may achieve a design of a maximum reflectivity without influence of process problems such as BM peeling or fluctuation of alignment, and a color mixing ratio of the transmissive picture is greatly reduced, thereby improving user experience.

Figure 7:
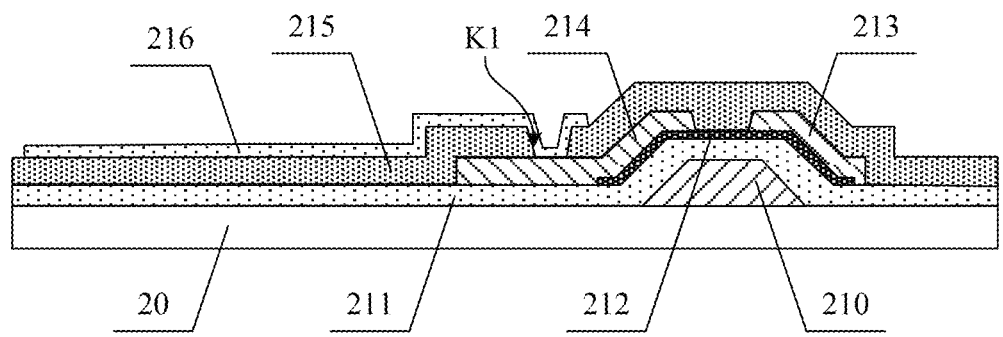
FIG. 7 is a schematic diagram of a cross-sectional structure of an array structure layer according to an embodiment of the present disclosure.

In some exemplary embodiments, the black matrix layer 12 further includes at least one second black matrix 12b. As shown in FIG. 7, an array layer 21 includes a gate electrode 210 disposed on a second base substrate 20, a first insulating layer 211 covering the gate electrode 210, an active layer 212 disposed on the first insulating layer 211, a source electrode 213 and a drain electrode 214 disposed on the first insulating layer 211 and the active layer 212, a second insulating layer 215 covering the source electrode 213 and the drain electrode 214, and a connection electrode 216 disposed on the second insulating layer 215. The second insulating layer 215 is provided with at least one first via K1, and the connection electrode 216 is connected to the drain electrode 214 through the first via K1.

An orthographic projection of the second black matrix 12b on the first base substrate 10 covers an orthographic projection of the first via K1 on the first base substrate 10.

The transflective LCD needs double areas including a reflective area and a transmissive area. Due to characteristics of outdoor sports of wearable products, maximizing a reflectivity, mainly reflection and supplementing by transmission, has become a primary requirement. A grid BM design is used for some transflective LCDs, a transmissive area and a reflective area can only be disposed in a BM opening area, which is not conducive to maximizing a reflection opening, and a reflectivity is low, and fluctuation of alignment in a cell forming process causes further loss of an aperture ratio and a decreased reflectivity.

Figure 8:
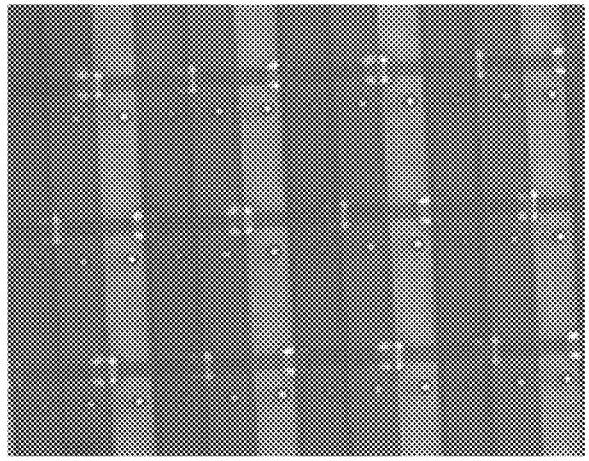
FIG. 8 is a schematic diagram of light leakage in cells of some display panels.
Figure 9:
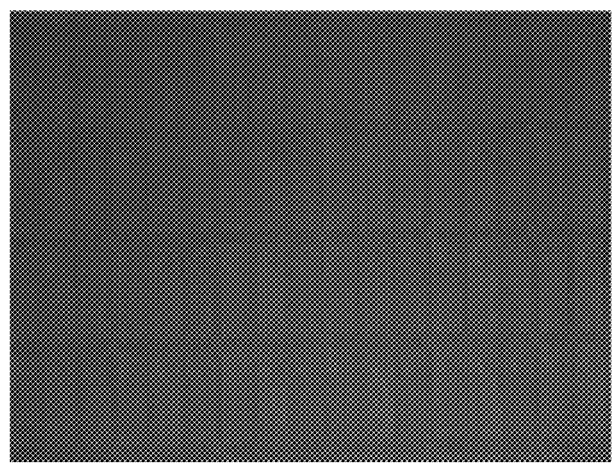
FIG. 9 is a schematic diagram of a light leakage detection result of a display panel according to an embodiment of the present disclosure.

FIG. 8 is a schematic diagram of light leakage phenomenon in a cell of a display panel. A patch "BM" designed in an embodiment of the present disclosure only shields a PS and a position of a first via, shields a light leakage position, ensures a maximum area of a reflective opening, improves a reflectivity, and a Contrast Ratio (CR) is greatly improved. FIG. 9 is an actual picture effect diagram of LO light leakage after adding a "patch" BM according to an embodiment of the present disclosure. Compared with FIG. 8, light leakage of a display panel according to the embodiment of the present disclosure is basically invisible.

In some exemplary embodiments, a distance between an edge of an orthographic projection of a first black matrix 12a on a first base substrate 10 and an edge of an orthographic projection of a spacer 4 on the first base substrate 10 is 1 μm to 3 μm. Exemplarily, the distance between the edge of the orthographic projection of the first black matrix 12a on the first base substrate 10 and the edge of the orthographic projection of the spacer 4 on the first base substrate 10 is 2 μm.

In some exemplary embodiments, a distance between an edge of an orthographic projection of a second black matrix 12b on a base substrate 10 and an edge of an orthographic projection of a first via on the base substrate 10 is 1 μm to 3 μm. Exemplarily, the distance between the edge of the orthographic projection of the second black matrix 12b on the first base substrate 10 and the edge of the orthographic projection of the first via on the first base substrate 10 is 2 μm.

Figure 10:
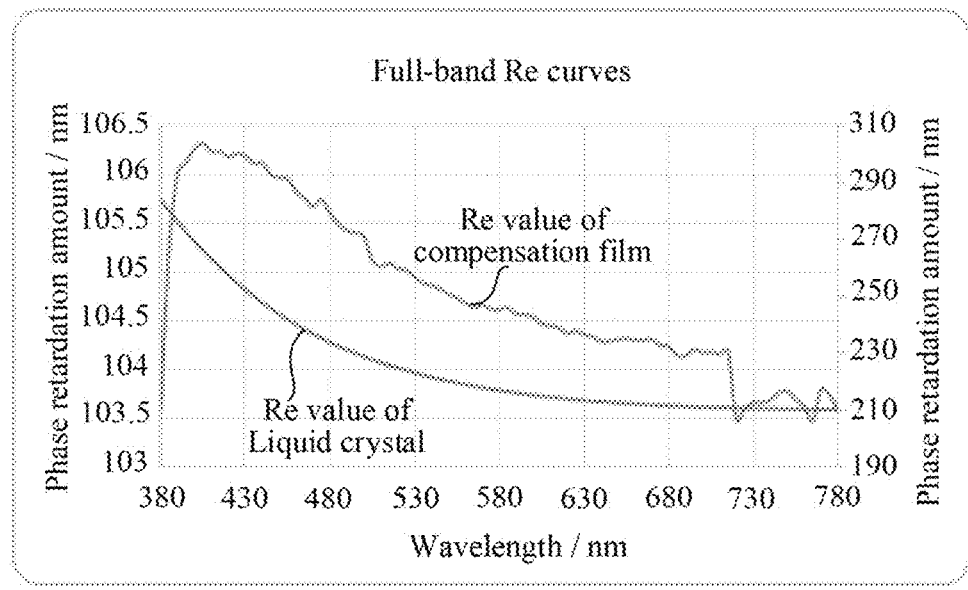
FIG. 10 is a schematic diagram of full-band phase retardation amount curves of some optical phase retardation materials.

As shown in FIG. 10, optical phase retardation materials used at present include compensation films and liquid crystals, both of which have a positive dispersion trend, that is, the longer the wavelength is, the lower the reflectivity is. In an optical path design of a reflective device, a LO (gray tone is 0) design is usually based on a wavelength of 550 nm. Due to a high phase retardation amount (value of Re) in a low band, blue light in a LO state cannot be absorbed by a polarizer, and leakage causes dark state reflection color shift, which greatly affects user experience adversely.

In an optical path design of the reflective mode, achievement of a LO dark state requires that light becomes circularly polarized light before reaching a reflective layer 24 through a liquid crystal layer 3. This process is represented by Poincare sphere to reach a pole point position on a spherical surface. Since wavelengths of RGB in visible light are different, a polarization state will be different after same phase retardation. A spherical surface of Poincare may be expressed by differences in distances passing the spherical surface. Change in polarization state of visible light of different wavelengths after passing through a phase difference compensation film with an axial azimuth angle θ and a phase difference R (λ) may be expressed on a Poincare sphere as: taking a position that forms an angle of 2θ with S1 as an axis, rotating clockwise from a starting position, a rotation angle is: Δ=360°×(R (λ)/λ), wherein λ is a wavelength of the light.

Figure 11:
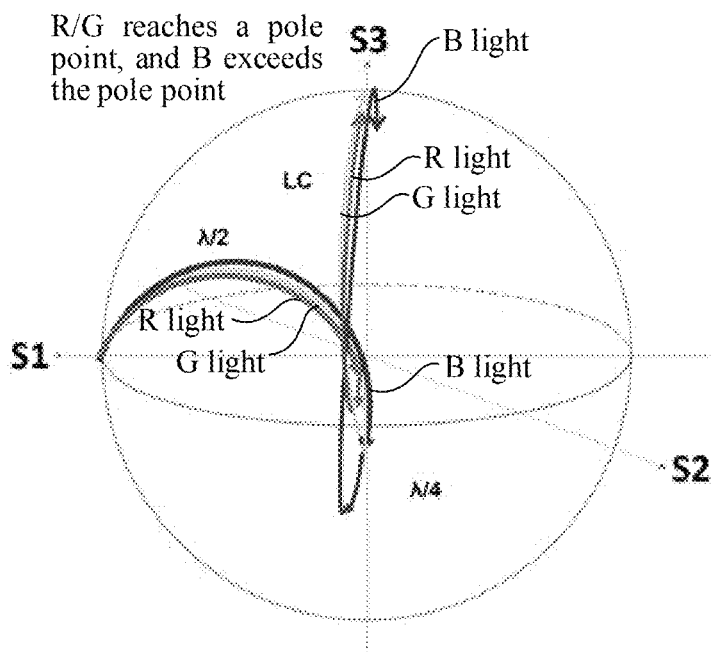
FIG. 11 is a schematic diagram of Poincare sphere models of some display panels.

As seen from the above formula, due to differences in wavelengths of multiple visible lights in RGB, a distance relationship traveled on the spherical surface is B>G>R. When an overall optical brightness of cells is the lowest, as shown in FIG. 11, G light is located at the pole point position, R light is located close to but not reaching the pole point position, and B light exceeds the pole point and travels for a long distance, which macroscopically represents that the blue light partially leaks out in a dark state, and LO color shift occurs.

Figure 12:
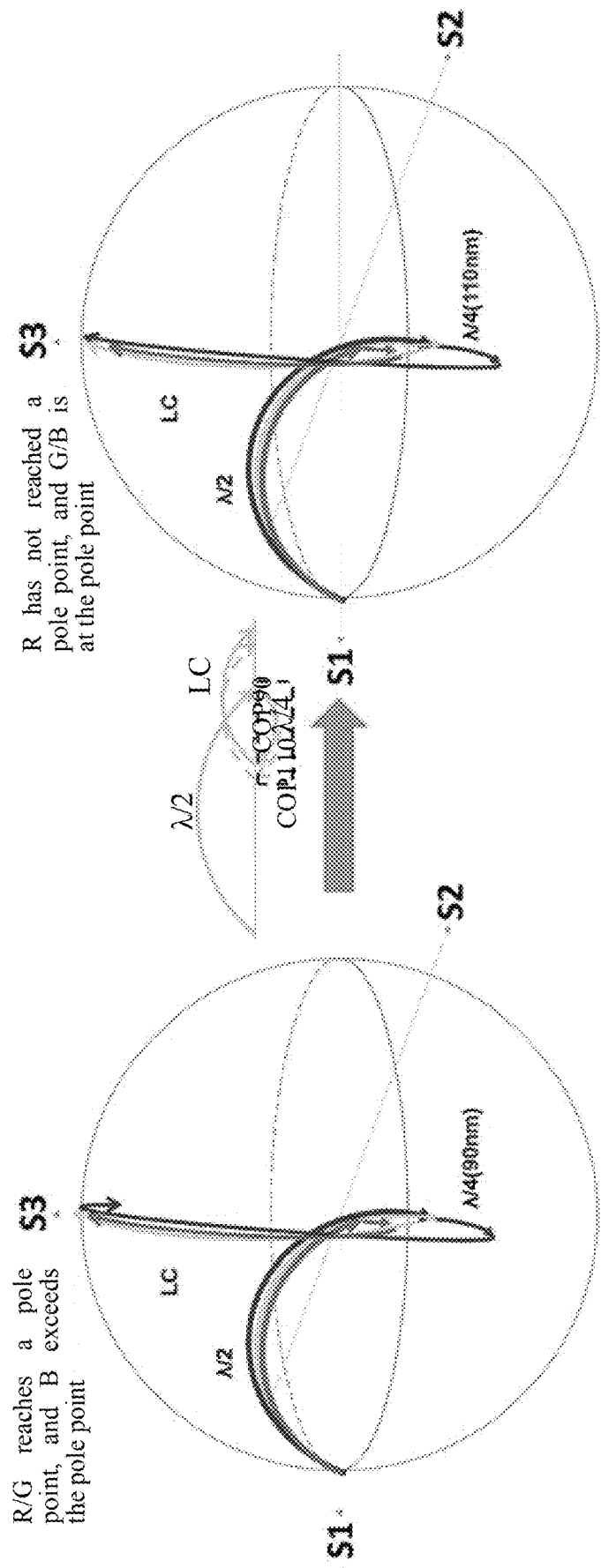
FIG. 12 is a schematic diagram of an improved principle of a Poincare sphere model of a display panel according to an embodiment of the present disclosure.
Figure 13:
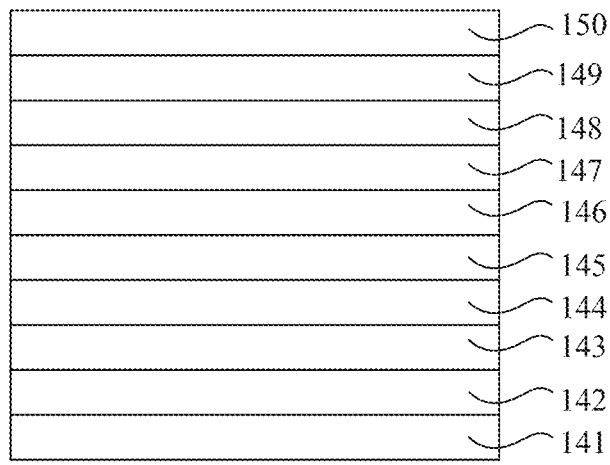
FIG. 13 is a schematic diagram of a structure of a first polarizer according to an embodiment of the present disclosure.
Figure 14:
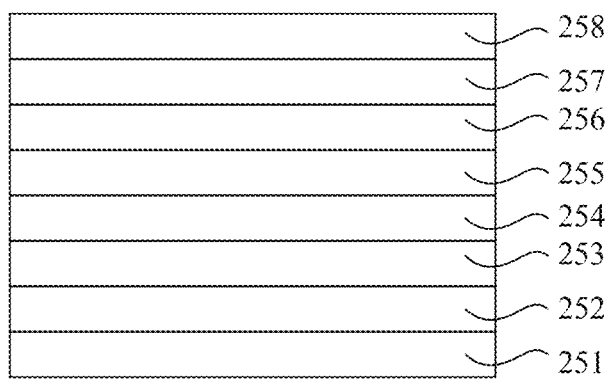
FIG. 14 is a schematic diagram of a structure of a second polarizer according to an embodiment of the present disclosure.
Figure 15A:
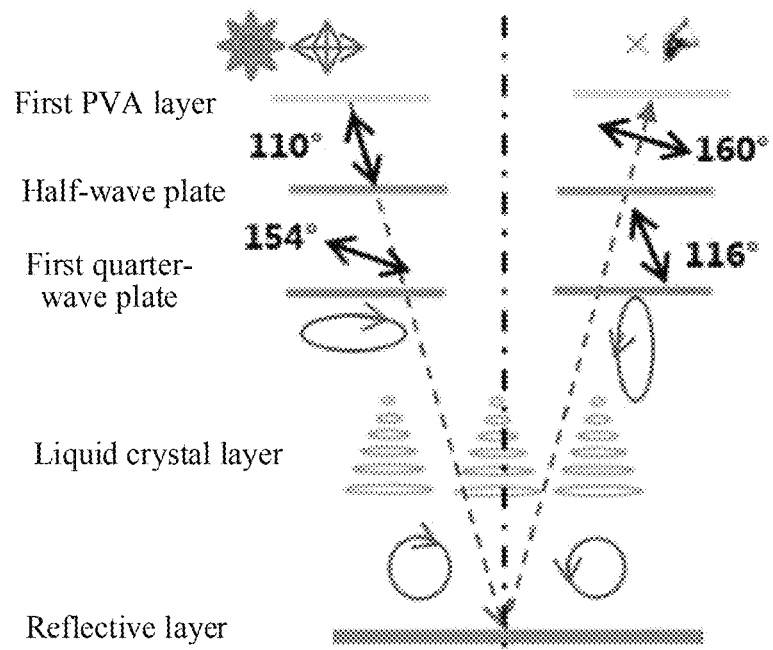
FIG. 15a is a schematic diagram showing a change in light polarization in an off-state of a reflective mode of a display panel according to an embodiment of the present disclosure.
Figure 15B:
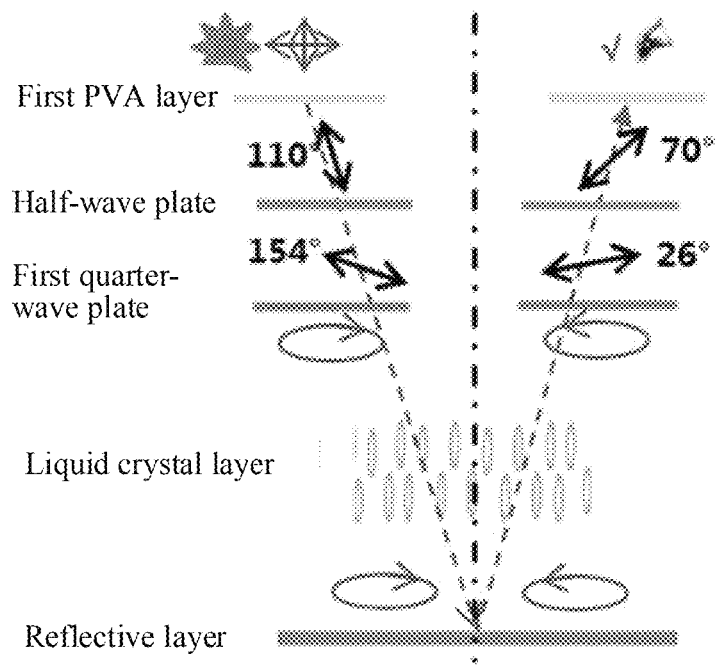
FIG. 15b is a schematic diagram showing a change in light polarization in an on-state of a reflective mode of a display panel according to an embodiment of the present disclosure.
Figure 15C:
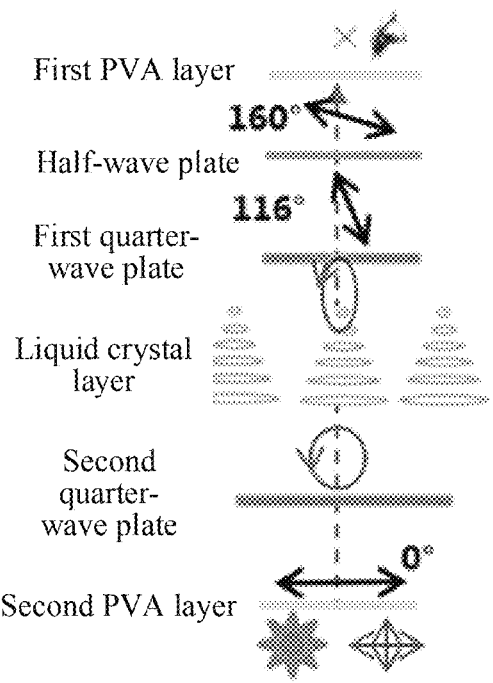
FIG. 15c is a schematic diagram showing a change in light polarization in an off-state of a transmissive mode of a display panel according to an embodiment of the present disclosure.
Figure 15D:
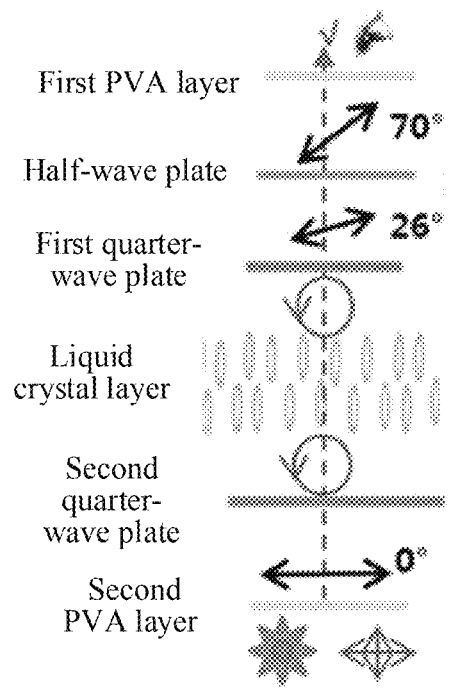
FIG. 15d is a schematic diagram showing a change in light polarization in an on-state of a transmissive mode of a display panel according to an embodiment of the present disclosure.

As shown in FIG. 12, according to the embodiment of the present disclosure, an optical path and a compensation value of a compensation plate are designed through a Poincare sphere model, and a ratio of RGB light output in an LO state is adjusted. On a spherical surface of a Poincare sphere, a phase compensation value of a first quarter-wave plate 144 is adjusted from 90 nm to 110 nm, and at the same time, an overall optical path matching design is adjusted, which may be described as that a distance of blue light that travels faster on the spherical surface is increased. The blue light beyond the pole point position adjusts an angle of a compensation film, so that it travels a proper distance just to reach the pole point, while red and green light fail to reach the pole point, a leakage amount of the red and green light is more than a leakage amount of the blue light in the LO state, and a problem of bluing and color shift in the LO state is improved.

As shown in FIG. 4 and FIG. 5, an embodiment of the present disclosure further provides a display panel, which includes a first substrate 1 and a second substrate 2 disposed oppositely, and a liquid crystal layer 3 sandwiched between the first substrate 1 and the second substrate 2.

The first substrate 1 includes a first polarizer 14, which is disposed on a side of a first base substrate 10 away from the second substrate 2. The first polarizer 14 includes a first quarter-wave plate 144, a second adhesive layer 145, a half-wave plate 146, a third adhesive layer 147, a first cellulose triacetate layer 148, a first poly vinyl alcohol layer 149, and a second cellulose triacetate layer 150 that are sequentially stacked from bottom to top. An absorption axis angle of the first poly vinyl alcohol layer 149 is n°, a slow axis angle of the half-wave plate 146 is ((n+41)%180°) to ((n+43)%180°), and a slow axis angle of the first quarter-wave plate 144 is ((n+162)%180°) to ((n+164)%180°), n is between 0 and 180.

In some exemplary embodiments, the first polarizer 14 further includes a first Optically Clear Adhesive (OCA) layer 141, a scattering film 142, and a first adhesive layer 143, and the first Optically Clear Adhesive (OCA) layer 141, the scattering film 142, the first adhesive layer 143, the first quarter-wave plate 144, the second adhesive layer 145, the half-wave plate 146, the third adhesive layer 147, the first cellulose triacetate (TAC) layer 148, the first poly vinyl alcohol (PVA) layer 149, and the second cellulose triacetate (TAC) layer 150 are sequentially stacked from bottom to top. The scattering film 142 is added to the first polarizer 14 to expand viewing angle. The first TAC layer 148 and the second TAC layer 150 are both 0-TAC to reduce phase interference. A surface of the first polarizer 14 may be coated so that it has a function of Hard Coating (HC).

In some exemplary embodiments, an absorption axis angle of the first PVA layer 149 may be set to 20°. A slow axis angle of the half-wave plate 146 may be 42°, and a slow axis angle of the first quarter-wave plate 144 may be 163°.

In some other exemplary embodiments, an absorption axis angle of the first PVA layer 149 may be set to 40°. A slow axis angle of the half-wave plate 146 may be 62°, and a slow axis angle of the first quarter-wave plate 144 may be 183°.

In some exemplary embodiments, a phase compensation value of the half-wave plate 146 may be 265 nm to 275 nm, exemplarily, the phase compensation value of the half-wave plate 146 may be 270 nm. A phase compensation value of the first quarter-wave plate 144 may be 105 nm to 115 nm, exemplarily the phase compensation value of the first quarter-wave plate 144 may be 110 nm.

In the embodiment of the present disclosure, a double compensation design is adopted for the first polarizer 14, including the half-wave plate 146 and the first quarter-wave plate 144. The half-wave plate 146 may be made of a Cyclo Olefin Polymer (COP) material, and the first quarter-wave plate 144 may also be made of a COP material.

In some exemplary embodiments, the second substrate 2 further includes a second polarizer 25, which is disposed on a side of the second base substrate 20 away from the first substrate 1, and includes a second quarter-wave plate 252, a fourth adhesive layer 253, a third cellulose acetate (TAC) layer 254, a second poly vinyl alcohol (PVA) layer 255, and a fourth cellulose acetate (TAC) layer that are sequentially stacked from bottom to top. An absorption axis angle of the second PVA layer 255 is (n+89)%180°) to (n+91)%180°), and a slow axis angle of the second quarter-wave plate 252 is (n+134)%180°) to (n+136)%180°).

In some exemplary embodiments, the second polarizer 25 further includes a second Optically Clear Adhesive (OCA) layer 251, a fifth adhesive layer 257, and an Advanced Patterning Film (APF) layer 258. The second Optically Clear Adhesive (OCA) layer 251, the second quarter-wave plate 252, the fourth adhesive layer 253, the third cellulose triacetate (TAC) layer 254, the second poly vinyl alcohol (PVA) layer 255, the fourth cellulose triacetate (TAC) layer 256, the fifth adhesive layer 257, and the Advanced Patterning Film (APF) layer 258 are sequentially stacked from bottom to top. An APF reinforced film is used for the second polarizer 25, and the third TAC layer 254 and the fourth TAC layer 256 are all made of a non-phase retardation material (0-TAC).

In some exemplary embodiments, an absorption axis angle of the first PVA layer 149 may be set to 20°. An absorption axis angle of the second PVA layer 255 is 110°, and a slow axis angle of the second quarter-wave plate 252 is 155°.

In some other exemplary embodiments, an absorption axis angle of the first PVA layer 149 may be set to 40°. An absorption axis angle of the second PVA layer 255 is 130°, and a slow axis angle of the second quarter-wave plate 252 is 175°.

In some exemplary embodiments, a phase compensation value of the second quarter-wave plate 252 is 135 nm to 145 nm.

In an embodiment of the present disclosure, a single compensation design is adopted for the second polarizer 25, including the second quarter-wave plate 252. Exemplarily, the second quarter-wave plate 252 may also be made of a COP material, and exemplarily, a phase compensation value may be 140 nm, and a slow axis angle may be 155°.

In some exemplary embodiments, a Twist Angle (TA) of the liquid crystal layer 3 is 51° to 53°. Exemplarily, the Twist Angle (TA) of the liquid crystal layer 3 may be 52°.

In some exemplary embodiments, a phase retardation amount (value of Re) of the liquid crystal layer 3 is 213.5 nm to 214.5 nm, a rubbing angle of the first substrate 1 is −109.5° to −108.5°, and a rubbing angle of the second substrate 2 is 122.5° to 123.5°.

Exemplarily, the phase retardation amount of the liquid crystal layer 3 is 214 nm, the rubbing angle of the first substrate 1 is −109°, and the rubbing angle of the second substrate 2 is 123°.

According to the embodiment of the present disclosure, a phase retardation amount of a compensation film and a matching relationship between a slow axis angle and a rubbing angle in a cell are designed, and a problem of bluing in a dark state of a TN normally black mode is improved and an optical display effect is optimized by utilizing the Poincare sphere theory.

A whole reflective optical path of the display panel of the embodiment of the present application is designed as the TN normally black mode. External light enters through the first polarizer 14, is reflected by the first polarizer 14, the first base substrate 10, the liquid crystal layer 3, and the reflective layer 24, and then exits after passing through the liquid crystal layer 3, the first base substrate 10, and the first polarizer 14 again. A transmissive optical path is that light is emitted from a backlight module (BLU), passes through the second polarizer 25, a transmissive area of the second base substrate 20, the liquid crystal layer 3, the first base substrate 10, and the first polarizer 14 to emit.

In the embodiment of the present disclosure, a reflective optical path angle is designed as follows: an absorption axis angle of the first PVA layer 149 is set to 20°, a material of a half-wave plate is COP, a phase compensation value is 270 nm, and a slow axis angle is 42°; a material of the first quarter-wave plate 144 is COP, a phase compensation value is 110 nm, and a slow axis angle is 163°; a value of Re of the liquid crystal layer 3 is 214 nm; a rubbing angle of the first substrate 1 is set to −109°; a rubbing angle of the second substrate 2 is set to 123°; and a TA of the liquid crystal layer 3 is 52°.

A transmissive angle is designed such that an absorption axis angle of the second PVA layer 255 is 110°, a material of the second quarter-wave plate 252 is COP, a phase compensation value is 140 nm, and a slow axis angle is 155°.

In an off-state of a reflective mode, natural light passes through the first PVA layer 149 and becomes linear polarized light parallel to 110°, passing through the half-wave plate, emitted light is linearly polarized light of 154°, and becomes circularly polarized light before reaching the reflective layer 24 under a dual action of the first quarter-wave plate 144 and the liquid crystal layer 3. After half-wave loss of the reflective layer 24, emitted light becomes circularly polarized light with an opposite rotation direction, a long axis of elliptical polarized light in a case before the emitted light reaches the first quarter wave plate 144 after passing through the liquid crystal layer 3, is perpendicular to a long axis of elliptical polarized light in a case before incident light enters a liquid crystal layer after exiting the first quarter wave plate 144. The emitted light becomes linearly polarized light again after passing through the first quarter-wave plate 144, becomes linearly polarized light of 160° after exiting the half-wave plate, and is parallel to an absorption axis angle of the first PVA layer 149 and absorbed. At this time, it is in the off-state.

In an on-state of the reflective mode, TN liquid crystal stands up in the on-state without refraction, and a polarization state before light reaches the reflective layer 24 is the same as a polarization state after the light exits the first quarter wave plate 144. A rotation direction is opposite after half-wave loss of the reflective layer 24 occurs, a rotation direction in a case after emitted light exits the liquid crystal layer 3, is opposite to a rotation direction in a case before incident light enters the liquid crystal layer 3, a phase difference is 180°, the emitted light becomes linearly polarized light of 70° after exiting the half-wave plate, and is perpendicular to an absorption axis angle of the first PVA layer 149 and may be transmitted. At this time, it is in the on-state.

In an off-state of a transmissive mode, light from a backlight module (BLU) becomes linearly polarized light of 20° after passing through the second PVA layer 255, forms an angle of 45° with the second quarter-wave plate 252, and becomes circularly polarized light before entering the liquid crystal layer 3. A subsequent optical path is consistent with an exit optical path in the off-state of the reflective mode, and the off-state is finally achieved.

In an on-state of the transmissive mode, light from a BLU becomes circularly polarized light before entering the liquid crystal layer 3 through the second PVA layer 255, and may be decomposed into two parts of light which are parallel and perpendicular to the exit optical path of the reflective mode. A parallel part finally passes through the first polarizer 14, while a vertical part is absorbed, thus achieving on-state control.

The technical solution of the embodiment is further described below through a preparation process of the array substrate according to the embodiment. A "patterning process" mentioned in the embodiment includes deposition of film layers, coating of photoresist, mask exposure, development, etching, stripping of photoresist, etc., and is a mature preparation process. Deposition may be performed by using a known process such as sputtering, evaporation, and chemical vapor deposition, coating may be performed by using a known coating process, and etching may be performed by using a known approach, which is not limited here. In the description of this embodiment, it should be understood that "thin film" refers to a layer of thin film manufactured through a material on a base substrate by using a deposition or coating process. If a patterning process or a photolithography process is not needed for the "thin film" during a whole manufacturing process, the "thin film" may also be referred to as a "layer". If a patterning process or a photolithography process is needed for the "thin film" during the whole manufacturing process, it is referred to as a "thin film" before the patterning process and referred to as a "layer" after the patterning process. The "layer" after the patterning process or photolithography process includes at least one "pattern".

Firstly, a first substrate 1 and a second substrate 2 are prepared respectively, the first substrate 1 includes a common electrode layer 11, a black matrix layer 12, and a color filter layer 13 which are sequentially disposed on a first base substrate 10, and the second substrate 2 includes an array structure layer 21, a shielding layer 22, an insulating layer 23, and a reflective layer 24 which are sequentially disposed on the second base substrate 20. Then, a liquid crystal 3 and a spacer 4 are dripped on one of the substrates, a frame sealant is coated on the other substrate, the first substrate 1 and the second substrate 2 are aligned. Pressing and curing of the frame sealant under vacuum conditions are performed to form a liquid crystal display panel. Finally, a first polarizer 14 is attached to an outside of the first substrate 1 and a second polarizer 25 is attached to an outside of the second substrate 2.

The preparation of the first substrate 1 includes the following acts.

(1) A polymer photoresist layer mixed with a black matrix material is coated on the first base substrate 10, and after exposure and development, a pattern of the black matrix layer 12 is formed. The black matrix layer 12 includes a first black matrix 12a and a second black matrix 12b. A position of the first black matrix 12a corresponds to a position of the spacer 4 formed later, that is, an orthographic projection of the first black matrix 12a on the first base substrate 10 covers an orthographic projection of the spacer 4 on the first base substrate 10, a position of the second black matrix 12b corresponds to a position of a first via formed later on a second insulating layer 215, that is, an orthographic projection of the second black matrix 12b on the first base substrate 10 covers an orthographic projection of the first via on the first base substrate 10. The black matrix layer 12 is used to shield light at a light leakage position. In the embodiment of the present disclosure, the light leakage position includes positions corresponding to the spacer 4 and the first via of the second insulating layer 215 on the second substrate 2.

In some exemplary embodiments, a distance between an edge of the orthographic projection of the first black matrix 12a on the first base substrate 10 and an edge of the orthographic projection of the corresponding spacer 4 on the first base substrate 10 is 1 μm to 3 μm. Exemplarily, the distance between the edge of the orthographic projection of the first black matrix 12a on the first base substrate 10 and the edge of the orthographic projection of the corresponding spacer 4 on the first base substrate 10 is 2 μm.

A distance between an edge of the orthographic projection of the second black matrix 12b on the first base substrate 10 and an edge of the orthographic projection of the corresponding first via on the first base substrate 10 is 1 μm to 3 μm. Exemplarily, the distance between the edge of the orthographic projection of the second black matrix 12b on the first base substrate 10 and the edge of the orthographic projection of the corresponding first via on the first base substrate 10 is 2 μm.

(2) A polymer photoresist layer mixed with a red pigment is coated on the first base substrate 10 formed with the aforementioned pattern, and after exposure and development, a pattern of red photoresist is formed. Patterns of green photoresist and blue photoresist are sequentially formed by using the same method and acts, and the red photoresist, the green photoresist, and the blue photoresist are arranged according to a set rule to form a color filter layer 13.

The red photoresist forms a red sub-pixel, the green photoresist forms a green sub-pixel, and the blue photoresist forms a blue sub-pixel, these sub-pixels are arranged according to a set rule to form a pixel. The red photoresist is used to filter red light, the green photoresist is used to filter green light, and the blue photoresist is used to filter blue light. In actual implementation, the first substrate 1 may not include the color filter layer 13, but the color filter layer 13 is disposed on the second substrate 2. The color filter layer 13 may also be disposed with four sub-pixels to form a pixel, for example, the four sub-pixels are a red sub-pixel, a green sub-pixel, a blue sub-pixel, and a white sub-pixel.

(3) On the first substrate 10 formed with the aforementioned pattern, a layer of Indium Tin Oxide (ITO) thin film is deposited on the first base substrate 10 by a method such as coating, magnetron sputtering, thermal evaporation or Plasma Enhanced Chemical Vapor Deposition (PECVD) to obtain the common electrode layer 11.

Then, a planarization layer and a rubbing layer are formed on the first base substrate 10 formed with the aforementioned pattern, and the rubbing layer is subjected to a rubbing treatment to complete the preparation of the first substrate 1.

The preparation of the second substrate 2 includes the following acts.

(I) A pattern of the array structure layer 21 is formed on the second base substrate 20.

The forming of the array structure layer 21 includes the following acts.

(a) A pattern of a gate metal layer is formed. The forming of the pattern of the gate metal layer includes: depositing a first metal thin film on the second base substrate 20, patterning the first metal thin film through a patterning process, and forming patterns of a gate line (not shown in the figure) and a gate electrode 210 on the second base substrate 20, wherein the gate line and the gate electrode 210 may be an integral structure.

(b) A pattern of an active layer 212 is formed. The forming of the pattern of the active layer 212 includes: sequentially depositing a first insulating thin film and an active layer thin film on the second base substrate 20 formed with the aforementioned pattern, and patterning the active layer thin film through a patterning process to form a first insulating layer 211 covering the pattern of the gate metal layer, and a pattern of the active layer 212 disposed on the first insulating layer 211, wherein a position of the active layer 212 corresponds to a position of the gate electrode 210.

(c) A pattern of a source-drain metal layer is formed. The forming of the pattern of the source-drain metal layer includes: depositing a second metal thin film on the second base substrate 20 formed with the aforementioned pattern, patterning the second metal thin film through a patterning process to form patterns of a data line (not shown in the figure), a source electrode 213, and a drain electrode 214 disposed on the first insulating layer 211. The source electrode 213 and the data line may be connected to each other in an integral structure, an end of the source electrode 213 adjacent to the drain electrode 214 is disposed on the active layer 212, an end of the drain electrode 214 adjacent to the source electrode 213 is disposed on the active layer 212, and a conductive channel is formed between the source electrode 213 and the drain electrode 214.

(d) A pattern of a via is formed. The forming of the pattern of the via includes: depositing a second insulating thin film on the second base substrate 20 formed with the aforementioned pattern, forming a second insulating layer 215 covering the pattern of the source-drain metal layer, patterning the second insulating layer 215 through a patterning process to form a pattern of a first via K1, and etching away the second insulating layer 215 in the first via K1 to expose a surface of the drain electrode 214.

(e) A pattern of a connection electrode 216 is formed. The forming of the pattern of the connection electrode 216 includes: depositing a transparent conductive thin film on the second base substrate 20 formed with the aforementioned pattern and patterning the transparent conductive thin film through a patterning process to form the pattern of the connection electrode 216, wherein the connection electrode 216 is connected to the drain electrode 214 through the first via K1.

In the embodiment of the present disclosure, the first metal thin film and the second metal thin film may be made of a metal material, such as silver (Ag), copper (Cu), aluminum (Al), or molybdenum (Mo), or an alloy material consisting of the above metals, and may be in a single-layer structure or a multi-layer composite structure. The first insulating thin film and the second insulating thin film may be made of silicon oxide (SiOx), silicon nitride (SiNx), silicon oxynitride (SiON), etc., or made of aluminum oxide (AlOx), hafnium oxide (HfOx), tantalum oxide (TaOx), etc., and may be a single-layer, a multi-layer, or a composite layer, and deposited through Chemical Vapor Deposition (CVD) or Plasma Enhanced Chemical Vapor Deposition (PECVD). Generally, the first insulating layer 211 is referred to as a Gate Insulator (GI) layer, and the second insulating layer 215 is referred to as a passivation (PVX) layer. The transparent conductive thin film is made of amorphous Indium Tin Oxide (α-ITO), and deposited through a magnetron sputtering method (Sputter).

(II) A third metal thin film is deposited on the second base substrate 20 formed with the aforementioned pattern, and the third metal thin film is patterned through a patterning process to form a pattern of a shielding layer 22 disposed on the array structure layer 21. A position of the shielding layer 22 corresponds to a position of a first space area 100 formed later, and is used for limiting light emitted by each sub-pixel to be emitted in its corresponding pixel, shielding lateral light leakage of the pixel, and preventing color mixing of a transmissive picture.

In some exemplary embodiments, the shielding layer 22 includes multiple light shielding units arranged sequentially along a first direction x, each light shielding unit extends along a second direction y, and a width of each light shielding unit in the first direction x is larger than that of the first space area 100 formed later in the first direction x.

In some exemplary embodiments, the width of each light shielding unit in the first direction x is 8.0 μm.

In some exemplary embodiments, the third metal thin film may be made of a metal material, such as molybdenum (Mo).

(III) A third insulating thin film and a fourth metal thin film are sequentially deposited on the second base substrate 20 formed with the aforementioned pattern, to form a third insulating layer 23 covering the pattern of the shielding layer 22, and a pattern of a reflective layer 24 disposed on the third insulating layer 23.

In some exemplary embodiments, the reflective layer 24 includes multiple reflective units arranged in an array along the first direction x and the second direction intersecting with each other, and the multiple reflective units form multiple reflective rows and multiple reflective columns. A first space area 100 is formed by space areas between the multiple reflective columns, and a second space area 200 is formed by space areas between the multiple reflective rows.

In some exemplary embodiments, each light shielding unit includes a first edge and a second edge, which are disposed opposite to each other in the first direction x. The first space area 100 includes a third edge and a fourth edge, which are disposed opposite to each other in the first direction x. A space between the first edge of each light shielding unit and the third edge of the corresponding first space area 100 is 2 μm. A space between the second edge of each light shielding unit and the fourth edge of the corresponding first space area 100 is 2 m.

In some exemplary embodiments, a width of the first space area 100 in the first direction x is 4 μm, and a width of the second space area 200 in the second direction y is 8 μm.

In the embodiment of the present disclosure, the fourth metal thin film may be made of silver (Ag) and deposited through a magnetron sputtering method (Sputter). The third insulating thin film may be made of silicon oxide (SiOx), silicon nitride (SiNx), silicon oxynitride (SiON), etc., or made of aluminum oxide (AlOx), hafnium oxide (HfOx), tantalum oxide (TaOx), etc., and may be a single-layer, a multi-layer, or a composite layer, and may be deposited through Chemical Vapor Deposition (CVD) or Plasma Enhanced Chemical Vapor Deposition (PECVD).

Then, a rubbing layer is formed on the second base substrate 20 formed with the aforementioned pattern, and a rubbing treatment is performed on the rubbing layer to complete the preparation of the second substrate 2.

A double compensation design is adopted for the first polarizer 14, which includes a first Optically Clear Adhesive (OCA) layer 141, a scattering film 142, a first adhesive layer 143, a first quarter-wave plate 144, a second adhesive layer 145, a half-wave plate 146, a third adhesive layer 147, a first cellulose triacetate (TAC) layer 148, a first poly vinyl alcohol (PVA) layer 149, and a second cellulose triacetate (TAC) layer 150 which are sequentially stacked from bottom to top. An absorption axis angle of the first poly vinyl alcohol layer 149 is n°, a slow axis angle of the half-wave plate 146 is $((n+41)\%180°)$ to $((n+43)\%180°)$, and a slow axis angle of the first quarter-wave plate 144 is $((n+162)\%180°)$ to $((n+164)\%180°)$, n is between 0 and 180.

Exemplarily, the absorption axis angle of the first PVA layer 149 may be set to 20°. The half-wave plate 146 may be made of a COP material, a phase compensation value may be 265 nm to 275 nm, exemplarily, the phase compensation value may be 270 nm, and a slow axis angle may be 41.5° to 42.5°, exemplarily, the slow axis angle may be 42°. The first quarter-wave plate 144 may be made of a COP material, a phase compensation value may be 105 nm to 115 nm, exemplarily, the phase compensation value may be 110 nm, and a slow axis angle may be 162.5° to 163.5°, exemplarily, the slow axis angle may be 163°. The first TAC layer 148 and the second TAC layer 150 are both 0-TAC.

A phase retardation amount (value of Re) of the liquid crystal layer 3 is 213.5 nm to 214.5 nm. Exemplarily, the phase retardation amount of the liquid crystal layer 3 is 214 nm. A rubbing angle of the first substrate 1 is −109.5° to −108.5°, and a rubbing angle of the second substrate 2 is 122.5° to 123.5°, and a TA of the liquid crystal layer 3 is 51.5° to 52.5°. Exemplarily, the rubbing angle of the first substrate 1 is −109°, and the rubbing angle of the second substrate 2 is 123°, and the TA is 52°.

A single compensation design is adopted for the second polarizer 25, which includes a second Optically Clear Adhesive (OCA) layer 251, a second quarter-wave plate 252, a fourth adhesive layer 253, a third cellulose triacetate (TAC) layer 254, a second poly vinyl alcohol (PVA) layer 255, a fourth cellulose triacetate (TAC) layer 256, a fifth adhesive layer 257, and an Advanced Patterning Film (APF) layer 258 which are sequentially stacked from bottom to top. An absorption axis angle of the second PVA layer 255 is $((n+89)\%180°)$ to $((n+91)\%180°)$, and a slow axis angle of the second quarter-wave plate 252 is $((n+134)\%180°)$ to $((n+136)\%180°)$.

Exemplarily, the absorption axis angle of the second PVA layer 255 is 109.5° to 110.5°, for example, the absorption axis angle of the second PVA layer 255 is 110°. The second quarter-wave plate 252 is made of a COP material, a phase compensation value may be 135 nm to 145 nm, and a slow axis angle is 154.5° to 155.5°, exemplarily, the phase compensation value may be 140 nm, and the slow axis angle is 155°. The third TAC layer 254 and the fourth TAC layer 256 are both 0-TAC.

It may be seen from the above introduction of this embodiment that the display panel according to the embodiment of the present disclosure is disposed with multiple light shielding units or multiple "patches" BM, so that the whole display panel does not need to be disposed with a strip-shaped black matrix for avoiding color mixing of a transmissive picture. Thus, the whole display panel may achieve a design of a maximum reflectivity without influence of process problems such as BM peeling or fluctuation of alignment, and a color mixing ratio of the transmissive picture may be reduced to below 5%, thereby improving user experience. For the preparation of the liquid crystal display panel in this embodiment, an existing process equipment and process method may be adopted, and has advantages of easy achievement, good process compatibility, low production cost, high product quality, and good application prospects.

In addition, according to the embodiment of the present disclosure, an optical path and a compensation value of a compensation plate are designed through a Poincare sphere model, and a ratio of RGB light output in an LO state is adjusted, blue light beyond a pole point position adjusts an angle of a compensation film, so that it travels a proper distance to just reach a pole point, while red and green light fail to reach the pole point, as a result, a leakage amount of the red and green light is more than a leakage amount of the blue light in the LO state, and a problem of bluing and color shift in the LO state is improved.

In this embodiment, a structure of the common electrode layer 11, the first polarizer 14, and the color filter layer 13 in the first substrate 1 is only an example, and in actual implementation, disposed positions of the three film layers may be adjusted according to actual needs. For example, the first polarizer 14 may be disposed on the color filter layer 13. In addition, the first substrate 1 may not include the color filter layer 13, but the color filter layer 13 may be disposed on the second substrate 2, and the first substrate 1 and the second substrate 2 may further include other film layers, such as a rubbing layer, which can be known and expanded by those skills in the art according to common knowledge and existing technologies, and are not limited here.

Figure 16:
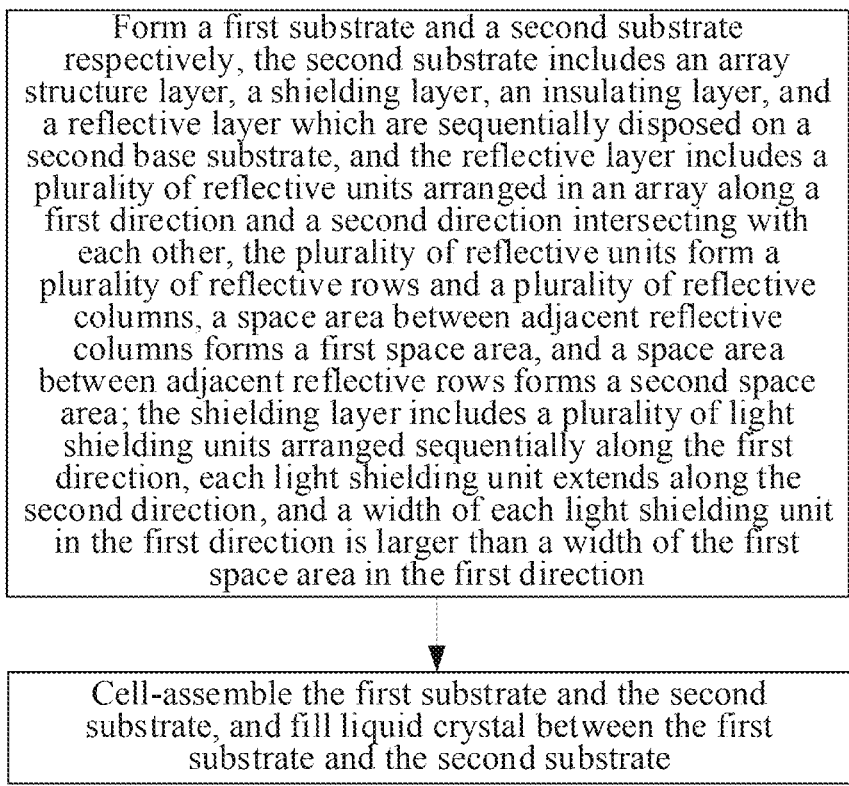
FIG. 16 is a schematic flowchart of a preparation method of a display panel according to an embodiment of the present disclosure.

As shown in FIG. 16, an embodiment of the present disclosure further provides a preparation method of a display panel, including the following acts.

In S1, a first substrate and a second substrate are formed respectively, the second substrate includes an array structure layer, a shielding layer, an insulating layer, and a reflective layer which are sequentially disposed on a second base substrate, and the reflective layer includes multiple reflective units arranged in an array along a first direction and a second direction intersecting with each other. The multiple reflective units form multiple reflective rows and multiple reflective columns, a space area between adjacent reflective columns forms a first space area, and a space area between adjacent reflective rows forms a second space area; the shielding layer includes multiple light shielding units arranged sequentially along the first direction, each light shielding unit extends along the second direction, and a width of each light shielding unit in the first direction is larger than a width of the first space area in the first direction.

In S2, the first substrate and the second substrate is cell-assembled, and liquid crystal is filled between the first substrate and the second substrate.

In some exemplary embodiments, the first substrate includes a common electrode layer, a black matrix layer, and a color filter layer which are sequentially disposed on a first base substrate, and at least one of the first substrate and the second substrate further includes a spacer.

The black matrix layer includes a first black matrix and a second black matrix, and an orthographic projection of the first black matrix on the first base substrate covers an orthographic projection of the spacer on the first base substrate.

The array structure layer includes a gate electrode disposed on the second base substrate, a first insulating layer covering the gate electrode, an active layer disposed on the first insulating layer, a source electrode and a drain electrode disposed on the first insulating layer and the active layer, a second insulating layer covering the source electrode and the drain electrode, and a connection electrode disposed on the second insulating layer. The second insulating layer is disposed with at least one first via, and the connection electrode is connected to the drain electrode through the first via, an orthographic projection of the second black matrix on the first base substrate covers an orthographic projection of the first via on the first base substrate.

A material of the reflective layer is metal, exemplarily, silver (Ag). A material of the connection electrode is a transparent conductive material, exemplarily, amorphous Indium Tin Oxide (α-ITO).

An embodiment of the present disclosure further provides a preparation method of a display panel, including the following acts.

In S1', a first substrate and a second substrate are formed respectively, the first substrate includes a black matrix layer and a color filter layer which are sequentially disposed on a first base substrate; at least one of the first substrate and the second substrate further includes a spacer, the black matrix layer includes at least one first black matrix, and an orthographic projection of each first black matrix on the first base substrate covers an orthographic projection of the spacer on the first base substrate.

In S2', the first substrate and the second substrate is cell-assembled, and liquid crystal is filled between the first substrate and the second substrate.

In some exemplary embodiments, the preparation method further includes: attaching a first polarizer to a side of the first substrate away from the second substrate, and attaching a second polarizer to a side of the second substrate away from the first substrate.

An embodiment of the present disclosure further provides a preparation method of a display panel, including the following acts.

In S1", a first substrate and a second substrate are formed respectively.

In S2", the first substrate and the second substrate is cell-assembled, and liquid crystal is filled between the first substrate and the second substrate.

In S3'", a first polarizer is attached to a side of the first substrate away from the second substrate, the first polarizer includes a first quarter-wave plate, a second adhesive layer, a half-wave plate, a third adhesive layer, a first triacetate cellulose layer, a first poly vinyl alcohol layer, and a second triacetate cellulose layer which are sequentially stacked from bottom to top, an absorption axis angle of the first poly vinyl alcohol layer is n°; a slow axis angle of the half-wave plate is $((n+41)\%180°)$ to $((n+43)\%180°)$, a slow axis angle of the first quarter-wave plate is $((n+162)\%180°)$ to $((n+164)\%180°)$, and n is between 0 and 180.

The preparation process of the display panel and the structures of the first polarizer and the second polarizer have been described in detail in the previous embodiments, and will not be repeated here.

According to the preparation method of the display panel provided by the embodiment of the present disclosure, multiple light shielding units or at least one first black matrix are disposed, so that the whole display panel does not need to be disposed with a strip-shaped black matrix for avoiding color mixing of a transmissive picture. Thus, the whole display panel may achieve a design of a maximum reflectivity without influence of process problems such as BM peeling or fluctuation of alignment, and a color mixing ratio of the transmissive picture may be reduced to below 5%, thereby improving user experience.

In addition, according to the preparation method of the display panel provided by the embodiment of the present disclosure, an optical path and a compensation value of a compensation plate are designed through a Poincare sphere model, and a ratio of RGB light output in an LO state is adjusted. Blue light beyond a pole point position adjusts an angle of a compensation film, so that it travels a proper distance to just reach a pole point, while red and green light fail to reach the pole point, a leakage amount of the red and green light is more than a leakage amount of the blue light in the LO state, and a problem of bluing and color shift in the LO state is improved.

An embodiment of the present disclosure further provides a display apparatus, including the aforementioned display panel. The display apparatus may be any product or component with a display function such as a mobile phone, a tablet computer, a television, a display, a notebook computer, a digital photo frame, and a navigator, or may be a wearable electronic device such as a smart watch and a smart wristband.

In recent years, smart wristbands (watches) are more and more popular among consumers because of their functions such as portability, timing, step counting, sleep monitoring, and color display, but their endurance is difficult to meet requirements of use. The transflective display apparatus provided by the embodiment of the present disclosure may effectively increase endurance of a smart wristband (watch).

Although the embodiments disclosed in the present disclosure are as described above, the content described is only the embodiments used to facilitate the understanding of the present disclosure, and is not intended to limit the present disclosure. Anyone skills in the art to which the present disclosure belongs may make any modifications and changes in implementation forms and details without departing from the spirit and scope disclosed in the present disclosure. However, the scope of patent protection of the present disclosure is still subject to the scope defined by the appended claims.

What is claimed is:

1. A display panel, comprising: a first substrate and a second substrate disposed oppositely, and a liquid crystal layer sandwiched between the first substrate and the second substrate, wherein,
   the first substrate comprises a black matrix layer and a color filter layer which are sequentially disposed on a first base substrate; at least one of the first substrate and the second substrate further comprises a spacer; and
   the black matrix layer comprises at least one first black matrix, and an orthographic projection of each first black matrix on the first base substrate covers an orthographic projection of the spacer on the first base substrate;
   wherein the second substrate comprises an array structure layer, a shielding layer, an insulating layer, and a reflective layer which are sequentially disposed on a second base substrate, wherein:
   the array structure layer comprises a plurality of gate lines, a plurality of data lines and a plurality of thin film transistors;
   the reflective layer comprises a plurality of reflective units arranged in an array along a first direction and a second direction intersecting with each other, the plurality of reflective units form a plurality of reflective rows and a plurality of reflective columns, a space area between adjacent reflective columns forms a first space area, and a space area between adjacent reflective rows forms a second space area; and
   the shielding layer comprises a plurality of light shielding units arranged separately and sequentially along the first direction, each light shielding unit extends along the second direction, and an orthographic projection of each light shielding unit on the second base substrate covers an orthographic projection of the first space area on the second base substrate.

2. The display panel according to claim 1, wherein the second substrate comprises a second base substrate and an array structure layer disposed on the second base substrate, wherein,
   the array structure layer comprises a gate electrode disposed on the second base substrate, a first insulating layer covering the gate electrode, an active layer disposed on the first insulating layer, a source electrode and a drain electrode disposed on the first insulating layer and the active layer, a second insulating layer covering the source electrode and the drain electrode, and a connection electrode disposed on the second insulating layer, and the second insulating layer is disposed with at least one first via, and the connection electrode is connected to the drain electrode through the first via; and
   the black matrix layer further comprises at least one second black matrix, and an orthographic projection of each second black matrix on the first base substrate covers an orthographic projection of one first via on the first base substrate.

3. The display panel according to claim 2, wherein a distance between an edge of the orthographic projection of the first black matrix on the first base substrate and an edge of the orthographic projection of the corresponding spacer on the first base substrate is 1 µm to 3 µm; and
   a distance between an edge of the orthographic projection of the second black matrix on the first base substrate and an edge of the orthographic projection of the corresponding first via on the first base substrate is 1 µm to 3 µm.

4. A display apparatus comprising the display panel according to claim 1.

5. A preparation method of the display panel, for preparing the display panel according to claim 1, the method comprising:
   forming the first substrate and the second substrate respectively, wherein the first substrate comprises the black matrix layer and the color filter layer which are sequentially disposed on the first base substrate; at least one of the first substrate and the second substrate further comprises the spacer, and the black matrix layer comprises the at least one first black matrix, and the orthographic projection of each first black matrix on the first base substrate covers the orthographic projection of the spacer on the first base substrate; and cell-assembling the first substrate and the second substrate, and filling liquid crystal between the first substrate and the second substrate.

6. A display panel, comprising: a first substrate and a second substrate disposed oppositely, and a liquid crystal layer sandwiched between the first substrate and the second substrate, wherein, the second substrate comprises an array structure layer, a shielding layer, an insulating layer, and a reflective layer which are sequentially disposed on a second base substrate;

the array structure layer comprises a plurality of gate lines, a plurality of data lines and a plurality of thin film transistors;

the reflective layer comprises a plurality of reflective units arranged in an array along a first direction and a second direction intersecting with each other, wherein the plurality of reflective units form a plurality of reflective rows and a plurality of reflective columns, a space area between adjacent reflective columns forms a first space area, and a space area between adjacent reflective rows forms a second space area; and the shielding layer comprises a plurality of light shielding units arranged separately and sequentially along the first direction, each light shielding unit extends along the second direction, and an orthographic projection of each light shielding unit on the second base substrate covers an orthographic projection of the first space area on the second base substrate;

wherein each light shielding unit comprises a first light shielding part and a second light shielding part, and an orthographic projection of the first light shielding part on the second base substrate is not overlapped with an orthographic projection of the second space area on the second base substrate; an orthographic projection of the second light shielding part on the second base substrate is overlapped with the orthographic projection of the second space area on the second base substrate, and a width of the second light shielding part in the first direction is larger than a width of the first light shielding part in the first direction.

7. The display panel according to claim 6, wherein the first light shielding part comprises a first edge and a second edge which are disposed opposite to each other in the first direction, and the first space area comprises a third edge and a fourth edge which are disposed opposite to each other in the first direction, and a space between the first edge of the first light shielding part and the third edge of the corresponding first space area is 1 μm to 3 μm, and a space between the second edge of the first light shielding part and the fourth edge of the corresponding first space area is 1 μm to 3 μm.

8. The display panel according to claim 6, wherein a width of the first space area in the first direction is 3 μm to 5 μm, and a width of the second space area in the second direction is 7 μm to 9 μm.

9. A display apparatus comprising the display panel according to claim 6.

10. A preparation method of the display panel, for preparing the display panel according to claim 6, the method comprising:

forming the first substrate and the second substrate respectively, wherein the second substrate comprises the array structure layer, the shielding layer, the insulating layer, and the reflective layer which are sequentially disposed on the second base substrate; the reflective layer comprises the plurality of reflective units arranged in the array along the first direction and the second direction intersecting with each other, wherein the plurality of reflective units form the plurality of reflective rows and the plurality of columns, the space area between the adjacent reflective columns forms the first space area, and the space area between the adjacent reflective rows forms the second space area; the shielding layer comprises the plurality of light shielding units arranged separately and sequentially along the first direction, each light shielding unit extends along the second direction, and the orthographic projection of each light shielding unit on the second base substrate covers the orthographic projection of the first space area on the second base substrate; and cell-assembling the first substrate and the second substrate, and filling liquid crystal between the first substrate and the second substrate.

* * * * *